Dec. 20, 1955          C. E. BRANICK          2,727,718
DEVICE FOR INSPECTING AND REPAIRING PNEUMATIC TIRES
Filed July 21, 1951          2 Sheets-Sheet 1
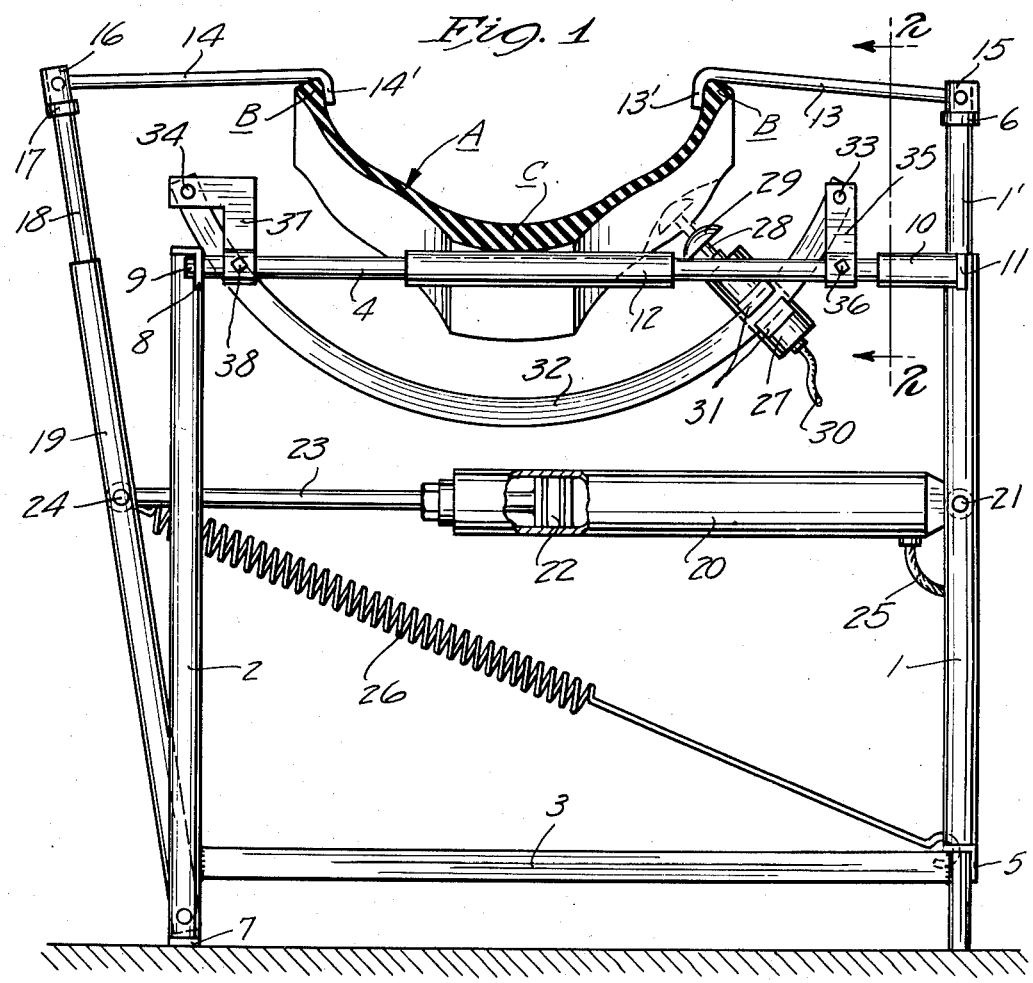
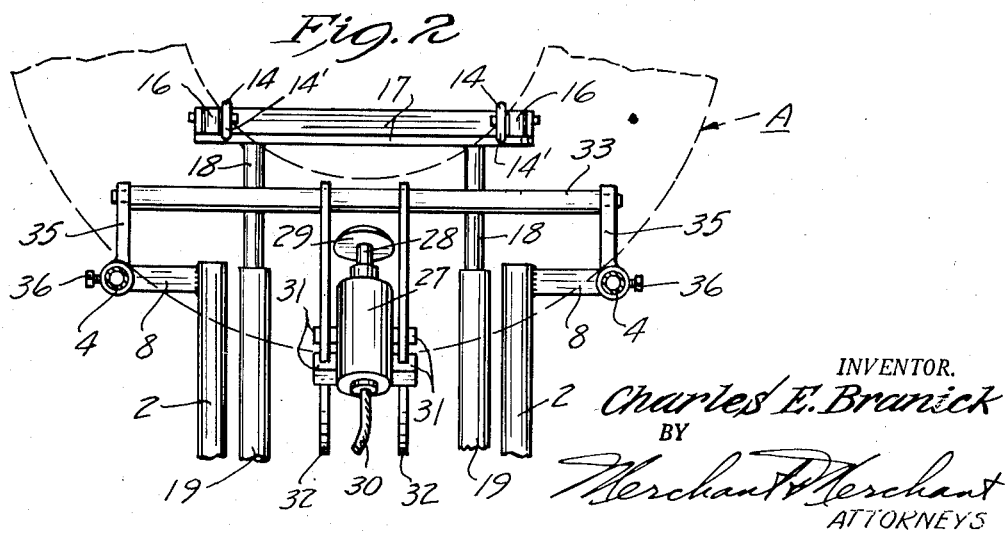
INVENTOR.
Charles E. Branick
BY
Merchant & Merchant
ATTORNEYS Dec. 20, 1955     C. E. BRANICK     2,727,718
DEVICE FOR INSPECTING AND REPAIRING PNEUMATIC TIRES
Filed July 21, 1951     2 Sheets-Sheet 2
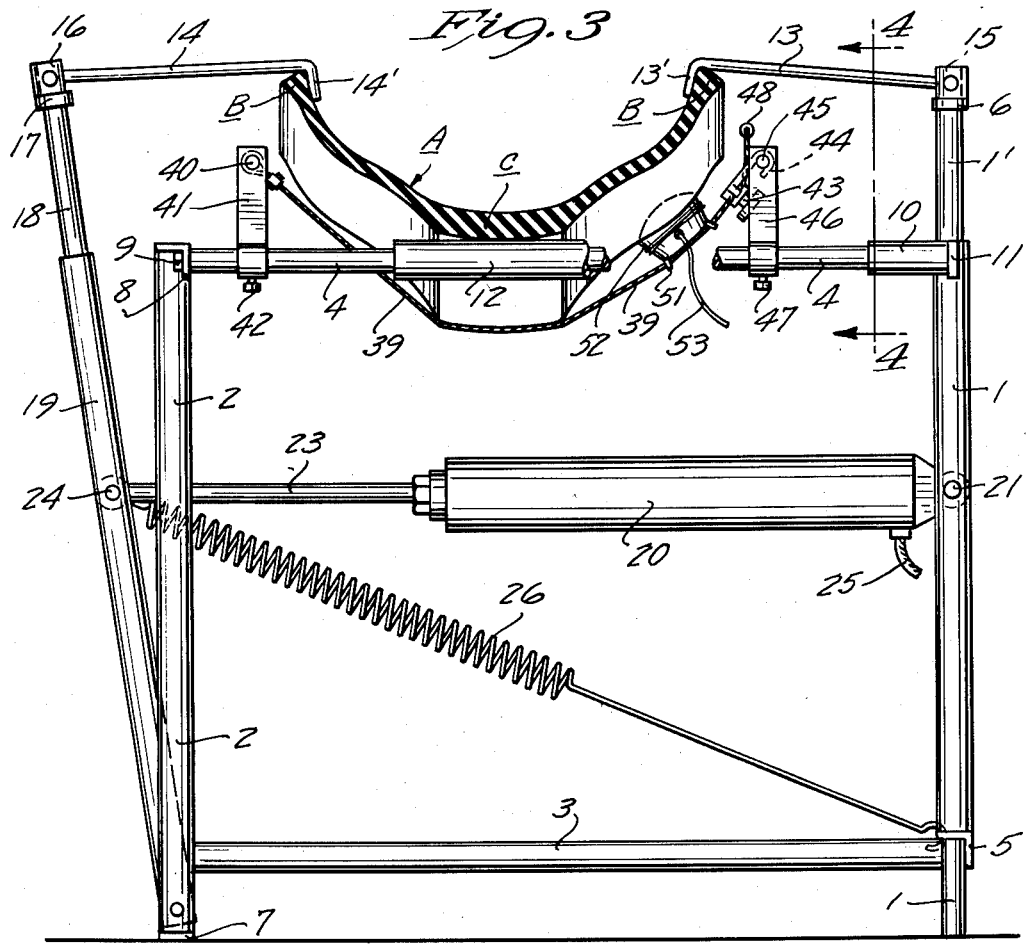
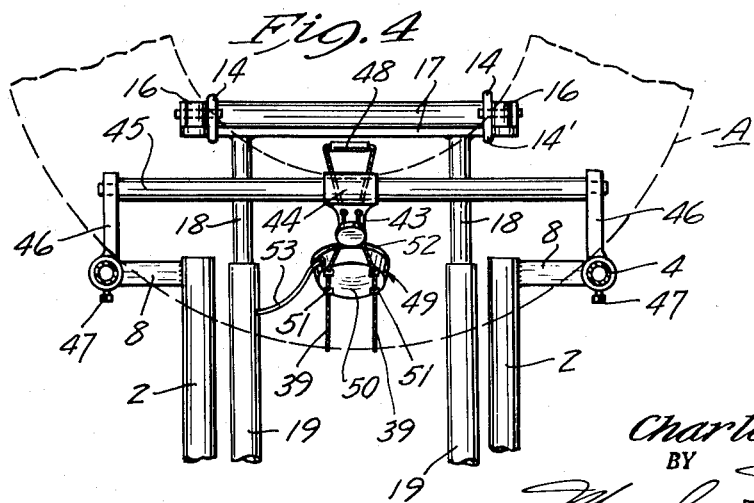
INVENTOR.
Charles E. Branick
BY
ATTORNEYS

United States Patent Office 2,727,718
Patented Dec. 20, 1955

2,727,718

DEVICE FOR INSPECTING AND REPAIRING PNEUMATIC TIRES

Charles E. Branick, Fargo, N. Dak.

Application July 21, 1951, Serial No. 237,990

5 Claims. (Cl. 254—50.3)

My present invention relates generally to tire repairing equipment and more specifically to improvements in tire casing spreaders and "inverters."

More particularly, my invention is in the nature of an improvement on devices used to spread apart the beads of a tire casing and to invert the crown thereof by forcing a ram or the like against the tread portion in the direction of the axis of a tire. Inversion is hereby defined as forcing the tire carcass at a given spot to cause a portion thereof to assume a reversely arcuate position to that which it normally occupies, for the purpose of facilitating repair to the carcass, the cords of which are broken or otherwise damaged, only on the inside of the tire. Inverting the tire, as above described, greatly facilitates skiving, buffing, inlaying, and otherwise repairing the injury, assuming, of course, that the device may be so operated as to invert that portion of the tire where the injury lies.

An important object of my invention is the provision of a device in which the inverting force is shiftable with respect to the tire casing whereby any portion of said casing, from bead to bead thereof, may be inverted.

Another object of my invention is the provision of a combination tire casing spreader and inverter in which the inverter may be quickly and easily positioned to invert any part of the tire casing adjacent the spread portion thereof.

Still another object of my invention is the provision of a tire spreader and inverter which is quickly and easily adapted to accommodate tire casings of various sizes.

A still further object of my invention is the provision of a device of the type set forth which is inexpensive to manufacture, which is efficient in operation, which may be operated with a minimum of skill, and which is rugged in construction and durable in use.

Other highly important objects and advantages of my invention will become apparent from the following detailed specification, appended claims, and attached drawings.

Referring to the drawings, which illustrate the invention, and in which like characters indicate like parts throughout the several views:

Fig. 1 is a view in side elevation of tire spreader and inverter made in accordance with my invention, some parts being broken away and some parts shown in section;

Fig. 2 is a fragmentary view partly in section and partly in end elevation, taken substantially on the line 2—2 of Fig. 1;

Fig. 3 is a view corresponding to Fig. 1, but illustrating a modified form of the invention; and Fig. 4 is a fragmentary view partly in section and partly in end elevation, taken substantially on the line 4—4 of Fig. 3.

Referring in greater detail to the preferred embodiment of the invention illustrated in Figs. 1 and 2, a generally rectangular frame structure is shown as comprising longitudinally spaced pairs of vertically extending legs 1 and 2 connected by longitudinally extending braces 3, one of which is shown, adjacent their lower ends and longitudinally extending tubular shafts 4. The legs 1 are connected by a transversely extending frame member 5 adjacent their lower end portions. The legs 1 are tubular in form and telescopically receive leg extensions 1' the upper ends of which are connected by a cross bar 6. The legs 1 are identical and it may be assumed that the extensions 1' are contained one each in each of the legs 1. The legs 2 are rigidly secured at their lower ends to a cross bar 7 and are provided at their upper ends with laterally outwardly projecting anchoring members 8 to the outer ends of which are rigidly secured, by bolts or the like 9, the adjacent ends of the longitudinally extending shafts 4. At their other ends, the shafts 4 are received in tubular socket-forming members 10 that are anchored to laterally outwardly projecting arms 11 welded or otherwise secured to the upper end portions of the legs 1. A pair of sleeves 12, one of which is shown, are mounted for rotary and sliding movements one each on one of the shafts 4 for a purpose which will hereinafter become apparent.

Tire spreading mechanism is shown as comprising opposed pairs of tire bead-engaging arms 13 and 14 the former of which are pivotally secured to bearing bosses 15 mounted in spaced relation on the cross bar 6 and the latter of which are pivotally mounted at one of their ends to bearing bosses 16 rigidly mounted on the opposite ends of a cross bar 17 mounted on a pair of spaced extension elements 18. Each of the spreader arms 13 and 14 are provided at their inner ends with downturned tire bead-engaging hooks 13' and 14' respectively. Extension elements 18 are one each telescopically received in the upper ends of each of a pair of laterally spaced parallel tubular members 19, which, at their lower ends, are pivotally secured to the lower end portions of the legs 2 for swinging movements longitudinally of the frame structure. Means for imparting tire spreading swinging movements to the tubular members 19 and the spreader arms 14 thereof includes a fluid pressure cylinder 20 pivotally mounted at one end between the legs 1, as indicated at 21; a piston 22 slidably mounted in the cylinder 20; and a piston rod or plunger 23 rigidly secured at one end to the piston 22 and pivotally mounted to the tubular members 19 intermediate their ends, as indicated at 24. Fluid under pressure is introduced to the cylinder 20 adjacent its pivoted end by conduit means 25 from a suitable source of supply, not shown, and is controlled by conventional valve means, also not shown. Retracting movements are imparted to the piston plunger 23 by a coil tension spring 26 anchored at one end to the pivotal connection 24 and at its other end to the frame member 5 when pressure is released from the interior of the cylinder 20. The spreader above described is of a type well known in the art. Hence, it is thought that further detailed showing and description thereof is unnecessary.

The sleeves 12 on the shafts 4 are adapted to support a pneumatic tire casing, fragmentarily shown and indicated by the letter A. The sleeves 12 being rotatable on the shafts 4 permit a tire casing to be easily rotated about it own axis so that the injured portion thereof may be positioned intermediate the shafts 4. The downturned hook-like ends 13' and 14' of the spreader arms 13 and 14 respectively are brought into hooking engagement with the bead portions B of the tire A after which fluid under pressure is introduced to the cylinder 20 to cause the tire beads to be spread apart, as indicated in Fig. 1.

Means for inverting the injured portion of the tire casing A comprises a fluid pressure cylinder 27 and a cooperating piston plunger 28 the outer free end of which is provided with a tire wall engaging head 29. The piston plunger 28 may be assumed to be connected to a conventional piston, not shown but contained within the cylinder 27. Fluid under pressure is introduced to the cylinder 27 from a source of supply, not shown, through conduit means 30 to impart tire inverting movements of the piston plunger 28 toward the tire casing A. The cylinder 27 is provided with opposed pairs of guide members 31 which are slidably mounted on a pair of laterally spaced arcuate hanger bars 32. As shown in Fig. 1, the hanger bars 32 are in underlying spaced relationship to the tire casing and define a curve following generally the axially extending curve formed by the spread portion of the tire casing A. The hanger bars 32 are secured at their opposite ends to transverse supporting bars or rods 33 and 34 the former of which is anchored at its opposite ends to the upper ends of supporting members 35 which at their lower ends are mounted for sliding movements one each on one of the shafts 4. Set screws 36 screw-threaded into the lower ends of the supporting members 35 may be tightened to lock said supporting members against movement with respect to the shafts 4. The transverse supporting bar or rod 34 is supported at its opposite ends by brackets 37 the lower ends of which are slidably mounted one each on one of the shafts 4 and which are provided with set screws or the like 38 for locking the same against movement with respect to the shafts 4. The guide elements or flanges 31, being rigid on the cylinder 27, and the arcuate or curved form of the hanger bars 32 cause the head-equipped piston plunger 28 to move generally perpendicularly toward the wall portion of the tire casing A to be inverted, whether said wall portion is adjacent the tire bead B or at the crown portion C of the tire A. The spreader arms 13 and 14 hold the tire casing A firmly against shifting movements so that any portion of the tire may be inverted to a point where the injured portion may be quickly and easily repaired. Inasmuch as the inverting force of the piston plunger 28 is applied radially against the hanger bars 32, shifting of the cylinder 27 on the hanger bars 32 during inversion is avoided. However, if desired, suitable locking means such as set screws, not shown, may be applied to the guide flanges 31 to lock the cylinder 27 against sliding movements on the hanger bars 32. By loosening the set screws 36 and 38, the hanger bars 32 and supporting brackets 35 and 37 thereof may be moved longitudinally of the frame structure to bring the hanger bars 32 into correct position with respect to the spread tire A.

In the modified form of the invention shown in Figs. 3 and 4, a tire spreader, identical in all respects to the tire spreader of Figs. 1 and 2, is identified by the same reference numerals and is shown as supporting a spread tire casing A in the same manner as does the spreader of Figs. 1 and 2. In this form of the invention, however, I utilize flexible hanger means in the nature of a pair of spaced parallel lengths of flexible metallic cable 39 underlying the tire casing A and anchored at one end to a transverse supporting bar 40 secured at its opposite ends to upstanding brackets 41 the lower ends of which are bored to receive the longitudinally extending shafts 4 and which are equipped with set screws or the like 42 for locking the brackets 41 against movement on the shafts 4. At their other ends, the lengths of cable 39 extend through and are rigidly held in a cable clamp 43 which is provided with a downturned hook 44 that is adapted to depend from a transverse bar 45. The bar 45 is rigidly secured at its opposite ends to the upper ends of spaced supporting brackets 46 identical in all respects to the brackets 41 and mounted on the shafts 4. Set screws 47 are screw-threaded into the lower ends of the brackets 46 and are adapted to bear against the shafts 4 to lock the brackets 46 in position. The lengths of cable 39 terminate in a handle member 48 whereby, when the clamp 43 is loosened, the lengths of cable 39 may be shortened or lengthened to accommodate tire casings of various sizes.

An inverter device 49 comprises a cup-shaped body 50 provided with apertured lugs 51 through which the cables 39 extend and which permit the body 50 to slide along the cable lengths from one end portion to the other thereof. An extendable and retractable element in the nature of a flexible diaphragm 52 covers the open top of the cup-shaped body 50 and cooperates therewith to define a fluid pressure chamber to which fluid under pressure is introduced from a source of supply, not shown, through a conduit 53. This form of inverter device is disclosed in detail in my prior United States Letters Patent No. 2,525,114 which also shows a hook-equipped cable clamp similar to the clamp 43 except for minor structural details. The brackets 41 and 46 being adjustable longitudinally of the spreader and the length of cables 39 also being adjustable, this form of the invention is quickly and easily adapted to efficiently invert portions of tire casings of a great variety of sizes and types.

Obviously, if desired, the cables 39 of Figs. 3 and 4 could be substituted for the arcuate hanger bars 32 of Figs. 1 and 2, whereby the cylinder 27 would be slidable on the flexible cables. It will be understood that my invention is capable of other arrangements and modifications without departure from the spirit and scope of the invention, as defined in the claims.

What I claim is:

1. A device for spreading and inverting pneumatic tire casings comprising a supporting structure including a pair of laterally spaced parallel tire supporting shafts, mechanism for spreading apart the bead portions of a tire casing and including opposed tire bead engaging spreader arms one of which is movable with respect to the other thereof generally in a direction longitudinally of said shafts, a tire casing inverter device including an extendable and retractable tire casing engaging element operable in response to fluid pressure and having a tire wall engaging head portion, a hanger including a pair of elements disposed in laterally spaced parallel relationship intermediate the tire supporting shafts with said inverter device being disposed between said hanger elements and slidable thereon, said hanger mounting and guiding said inverter device for movements about a curve similar to and outwardly spaced from a curve generally defined by the exterior of the spread portion of a tire casing mounted on said supporting shafts and extending generally in the direction of the axis of rotation of said tire, bracket means at opposite ends of said hanger mounted on said shafts for limited movements axially of said shafts whereby to center said tire casing with respect to said hanger, and means for releasably locking said bracket means and hanger against said movements with respect to said shafts, said hanger directing the extendable and retractable member substantially perpendicular toward the tire casing surface portion to be inverted.

2. The structure defined in claim 1 wherein said extendable and retractable tire casing engaging element comprises a fluid pressure operated cylinder and cooperating piston, said piston having the free end thereof terminating in said tire wall engaging head portion and said hanger elements comprise rigid arcuate shaped bars with said cylinder disposed therebetween.

3. The structure defined in claim 1 wherein said extendable and retractable tire casing engaging element comprises an open-ended cup-shaped body defining a fluid pressure chamber and a flexible diaphragm member defining said tire wall engaging head portion closing the open end of the body and being responsive to the fluid pressure therein and said hanger elements comprise flexible cables with said body disposed therebetween.

4. A device for spreading and inverting portions of pneumatic tire casings comprising a generally rectangular supporting frame, mechanism carried by said frame for spreading apart the bead portions of a pneumatic tire casing and including opposed bead-engaging spreader arms extending generally longitudinally of said frame, a tire casing inverter device including an extendable and retractable tire casing engaging element, said element comprising a fluid pressure operated cylinder and cooperating piston, said piston having the free end terminating in a tire wall engaging head, a rigid arcuate hanger mounted on said frame, said hanger comprising a pair of arcuate hanger bars disposed in laterally spaced parallel relationship intermediate the ends of said frame with said hanger mounting and guiding said inverter device for movements generally longitudinally of said frame, said hanger underlying the spread portion of a tire casing mounted on said frame and engaged by said spreader arms, and directing the extendable and retractable element generally perpendicularly toward the tire casing surface portion to be inverted with said fluid pressure operated cylinder being disposed between said hanger bars and slidable thereon.

5. A device for spreading and inverting portions of pneumatic tire casings comprising a generally rectangular supporting frame, mechanism carried by said frame for spreading apart the bead portions of a pneumatic tire casing and including opposed bead-engaging spreader arms extending generally longitudinally of said frame, a tire casing inverter device including an extendable and retractable tire casing engaging element, said element comprising an open-ended cup shaped body defining a fluid pressure chamber and a flexible diaphragm member having a tire wall engaging portion closing the open end of the cup-shaped body and being responsive to fluid pressure therein, a hanger mounted on said frame, said hanger comprising a pair of flexible cables disposed in laterally spaced parallel relationship intermediate the ends of said frame with said hanger mounting and guiding said inverter device for movements generally longitudinally of said frame, said hanger underlying the spread portion of a tire casing mounted on said frame and engaged by said spreader arms, and directing the extendable and retractable element generally perpendicularly toward the tire casing surface portion to be inverted with said fluid pressure operated chamber being disposed between said hanger cables and slidable thereon.

References Cited in the file of this patent

UNITED STATES PATENTS

| | | |
|---|---|---|
| 2,310,891 | Branick | Feb. 9, 1943 |
| 2,347,952 | James | May 2, 1944 |
| 2,375,595 | Stoehr | May 8, 1945 |
| 2,496,389 | Goodman | Feb. 7, 1950 |
| 2,525,114 | Branick | Oct. 10, 1950 |

FOREIGN PATENTS

| | | |
|---|---|---|
| 894,388 | France | June 19, 1944 |